(12) United States Patent
Borchardt

(10) Patent No.: US 9,238,155 B2
(45) Date of Patent: Jan. 19, 2016

(54) CONCRETE DECK TIE-OFF ANCHOR POINT AND SYSTEM

(71) Applicant: Mark A. Borchardt, Seattle, WA (US)

(72) Inventor: Mark A. Borchardt, Seattle, WA (US)

( * ) Notice: Subject to any disclaimer, the term of this patent is extended or adjusted under 35 U.S.C. 154(b) by 0 days.

(21) Appl. No.: 14/309,372

(22) Filed: Jun. 19, 2014

(65) Prior Publication Data

US 2015/0367152 A1   Dec. 24, 2015

(51) Int. Cl.
*E04B 1/38* (2006.01)
*A62B 35/00* (2006.01)
*F16M 13/02* (2006.01)

(52) U.S. Cl.
CPC .......... *A62B 35/0068* (2013.01); *F16M 13/027* (2013.01)

(58) Field of Classification Search
CPC .... A62B 35/0068; F16M 13/027; E04B 5/00; E04B 1/40; E04B 1/4178; E04B 1/38; E04B 2/30
See application file for complete search history.

(56) References Cited

U.S. PATENT DOCUMENTS

| | | | | |
|---|---|---|---|---|
| 3,550,343 | A * | 12/1970 | Buske | 52/704 |
| 3,821,338 | A * | 6/1974 | Faust | 264/35 |
| 3,873,147 | A * | 3/1975 | Annable et al. | 294/89 |
| 4,318,525 | A * | 3/1982 | Welch | 248/228.7 |
| 5,553,685 | A * | 9/1996 | Cook | 182/45 |
| 5,625,993 | A * | 5/1997 | Kelly | 52/704 |
| 5,699,639 | A * | 12/1997 | Fernandez | 52/707 |
| 7,254,926 | B2 * | 8/2007 | Eldeen | 52/698 |
| 7,654,057 | B2 * | 2/2010 | Zambelli et al. | 52/710 |
| 2005/0257446 | A1 * | 11/2005 | Wolner et al. | 52/127.1 |
| 2006/0060439 | A1 * | 3/2006 | Shirokoshi et al. | 188/382 |
| 2006/0242924 | A1 * | 11/2006 | Kwon et al. | 52/704 |
| 2007/0039258 | A1 * | 2/2007 | Walker, III | 52/235 |
| 2008/0042029 | A1 * | 2/2008 | Reeves | 248/231.91 |
| 2011/0309041 | A1 * | 12/2011 | Amadio et al. | 211/26 |
| 2013/0185906 | A1 * | 7/2013 | Nichols, Jr. | 24/703.1 |
| 2014/0251724 | A1 * | 9/2014 | Nichols, Jr. | 182/3 |
| 2015/0196785 | A1 * | 7/2015 | Borchardt | 52/700 |

* cited by examiner

*Primary Examiner* — Mark Wendell
*Assistant Examiner* — Keith Minter
(74) *Attorney, Agent, or Firm* — Dean A Craine

(57) ABSTRACT

A ceiling anchor point and anchor point system for a concrete deck. The anchor point includes a receiver box attached to the form used to construct a concrete deck that becomes embedded the concrete deck. The receiver box is a partially enclosed structure with a lower slot opening that communicates with an interior cavity. The receiver box includes flange surfaces that attached to the inside surface of a form used to construct the concrete deck. Extending transversely through the interior cavity is a rod with its opposite ends that extend laterally from the sides of the receiver box and become covered with concrete. Attached to the portion of the rod located inside the interior cavity is an elongated connector plate. The connector plate is assembled on the rod and is configured to rotate around the rod and nests entirely inside the receive box or extend downward through the slot opening. Formed on the lower end of the connector plate is a second hole that connects to a suitable snap hook or clip used by a construction worker when working near a leading edge fall hazard.

8 Claims, 4 Drawing Sheets

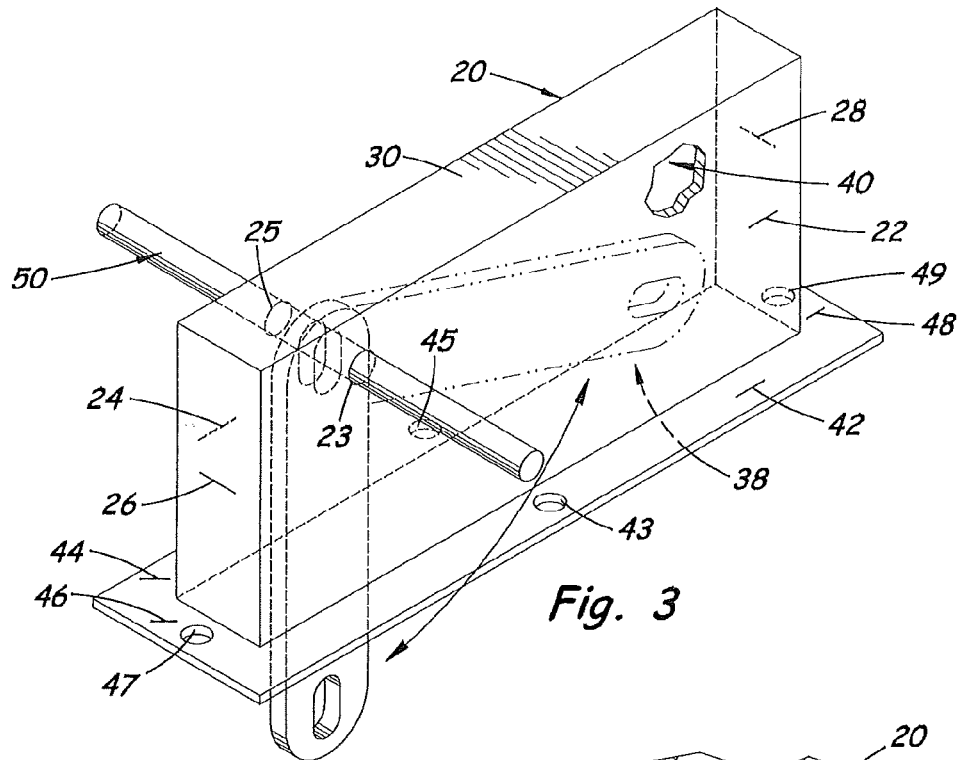
Fig. 3
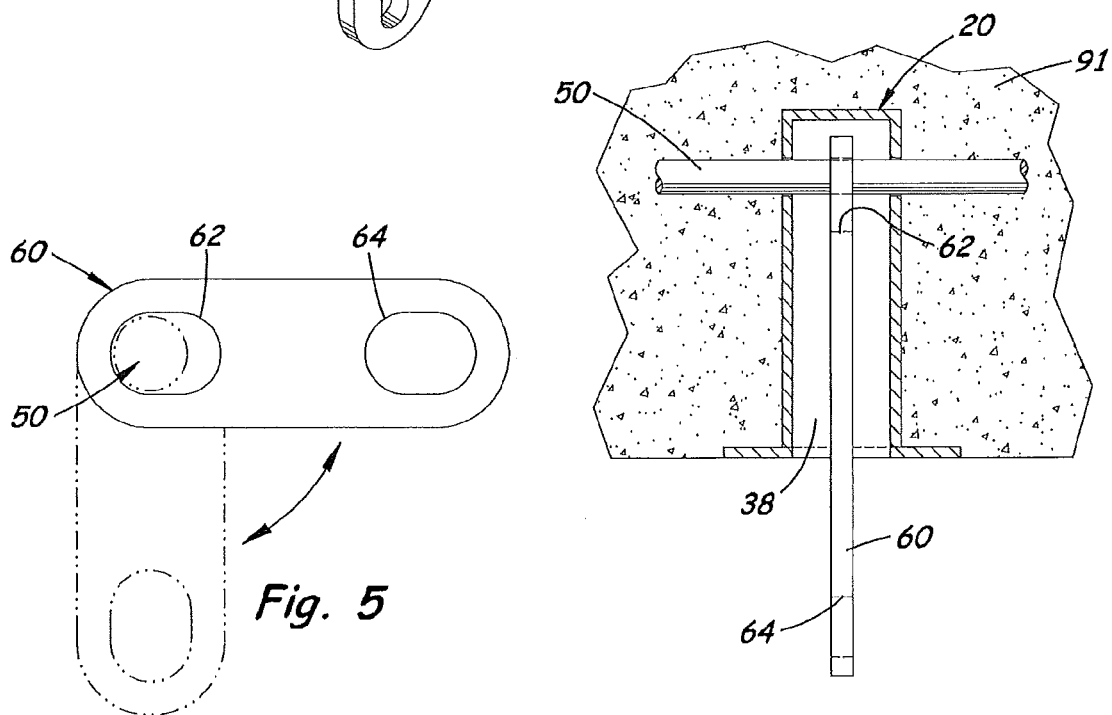
Fig. 5
Fig. 4

CONCRETE DECK TIE-OFF ANCHOR POINT AND SYSTEM

Notice is given that the following patent document contains original material subject to copyright protection. The copyright owner has no objection to the facsimile or digital download reproduction of all or part of the patent document, but otherwise reserves all copyrights.

BACKGROUND OF THE INVENTION

1. Field of the Invention

This invention pertains to apparatus, systems and methods for constructing fall prevention anchor points in a concrete ceiling.

2. Description of the Related Art

Many buildings have floors made of concrete slabs or decks manufactured by pouring wet concrete into wood forms. After the concrete has dried and cured, the wood forms are removed exposing the exterior surfaces of the concrete deck. When the bottom surface of the concrete deck acts as the ceiling for a lower floor, HVAC duct work, plumbing and electrical conduits, and insulation materials are sometimes attached to the bottom surface.

Federal, state and local regulations require workers use or wear fall restraining or fall arresting equipment when working at elevations greater than 6 feet above a floor or when working near the open leading edge of a building. Such equipment typically includes lanyards attached at one end to a harness or vest worn by the worker. The opposite end of the lanyard is attached to a rigid anchor point.

When working on the floor of a building with open leading edges, workers must wear fall arresting equipment at all times. Because the workers must move on the floor, the fall arresting equipment must allow the worker to move freely over the floor.

What is needed is an inexpensive, easy to install anchor point that attaches to a fall resistant lanyard worn by a worker that is embedded into a concrete deck which forms the ceiling for a lower floor. What is also needed is an anchor point that is partially exposed and readily visible to workers working on the lower floor.

What is also needed is an anchor point system that allows a worker to move over the floor which includes at least two anchor points identified above that can be easily attached to a cable that extends below and parallel to the ceiling, and a slide connector selectively attaches to the cable that is attached to the end of the lanyard thereby enabling the worker to move freely on the floor.

SUMMARY OF THE INVENTION

A concrete deck anchor point is disclosed that includes a plate connector that drops down through a lower slot opening formed on a narrow, partially enclosed receiver box assembled into the bottom surface of a concrete deck that forms the ceiling for a lower floor in a building. The receiver box is oriented so the lower slot opening is flush with the bottom surface of the concrete deck and exposed when the form used to construct the concrete deck is removed.

The receiver box is a hollow, five-sided elongated box with two long walls, two end walls, and a top panel. Formed on the receiver box opposite the top panel is a rectangular slot opening that leads to a narrow, upward extending interior cavity formed inside the receiver box. Disposed around the slot opening and perpendicular aligned with the box's side walls and end walls is at least one laterally extending mounting surfaces. Formed on the mounting surface is at least one nail hole or slot.

During assembly, the receiver box is mounted with its slot opening facing downward against the inside surface of a planar wood form used to create the bottom surface of the concrete deck. The receiver box is also oriented so its mounting surface is positioned adjacent to the inside surface of the wood form. A nail or screw is inserted into the hole or slots to hold the receiver box in place on the wood form when wet concrete is poured over the wood form and around the receiver box. When the concrete is cured, the wood form is removed and the receiver box with a slot opening facing downward is embedded into the concrete deck. When the form is removed, the slot opening is exposed.

Formed on the receiver box's two opposite long walls are two rod openings configured to receive a rod extending transversely through the interior cavity formed in the receiver box. The ends of the rod extend laterally from the long side walls and become embedded in the concrete when the concrete deck is poured.

Connected to the portion of the rod that extends into the interior cavity is a thin connector plate. In one embodiment, the connector plate includes two holes formed on its opposite ends. During assembly, the connector plate is inserted into the interior cavity so the rod extends through one hole formed on the connector plate to permanently connect the connector plate to the rod. Because the two holes are on opposite ends of the connector plate, the connector plate freely rotates around the rod and the opposite ends extends downward from the slot opening after the wood form is removed. The lengths of the receiver box and the connector plate are sufficient so the connector plate is disposed inside the receiver box when the receiver box is attached to the inside surface of the wood form. When the wood form is removed, the connector plate automatically extends downward through the slot opening and is visible. A suitable snap hook or D-ring connector connected to a fall resistant lanyard or safety strap attached to a safety harness or vest worn by the worker. The lanyard or safety strap and harness or vests are fall resistant structures designed to prevent injuries from falls.

In another embodiment of the invention, at least two anchor points are assembled on the bottom surface of a concrete deck and a cable attached at its opposite ends attaches at its opposite ends to the two connector plates. A suitable snap hook or D-ring connector configured to slide over the cable is attached to a fall resistant lanyard or safety strap connected to a worker that enables the worker to move over the floor and longitudinally under the cable.

DESCRIPTION OF THE DRAWINGS

FIG. 3 is a perspective view of the anchor system.

FIG. 4 is a sectional, end elevational view the anchor system imbedded in a concrete deck taken along line 4-4 in FIG. 1.

FIG. 5 is a side elevational view of the connector plate.

DESCRIPTION OF THE PREFERRED EMBODIMENT(S)

Figure 1:
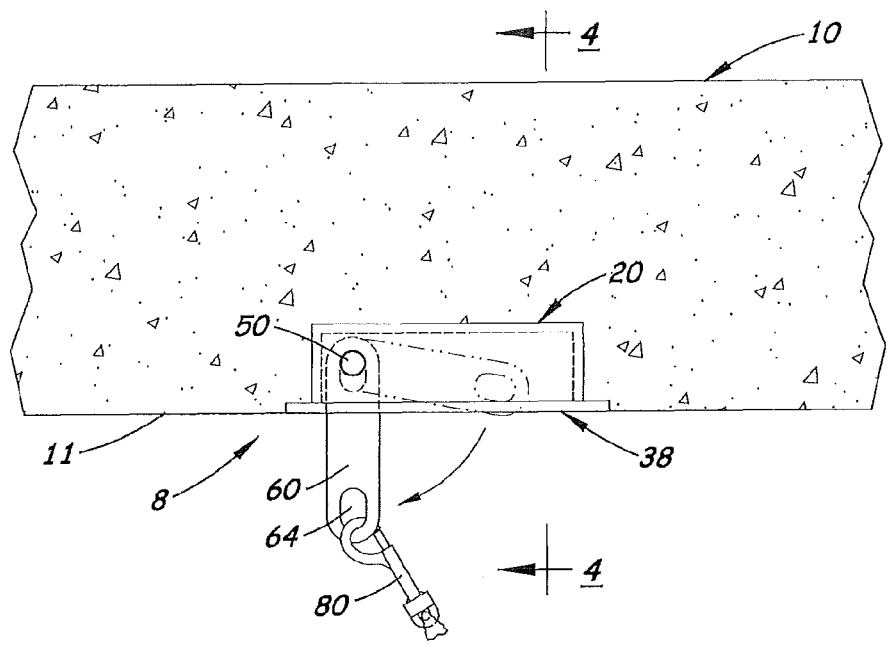
FIG. 1 is a sectional front elevational view of a section of a concrete deck with the tie off anchor system embedded into the ceiling of the concrete deck and showing the connector plate rotated downward so its lower end extends through the slot opening and act as an anchor point for a safety strap.
Figure 2:
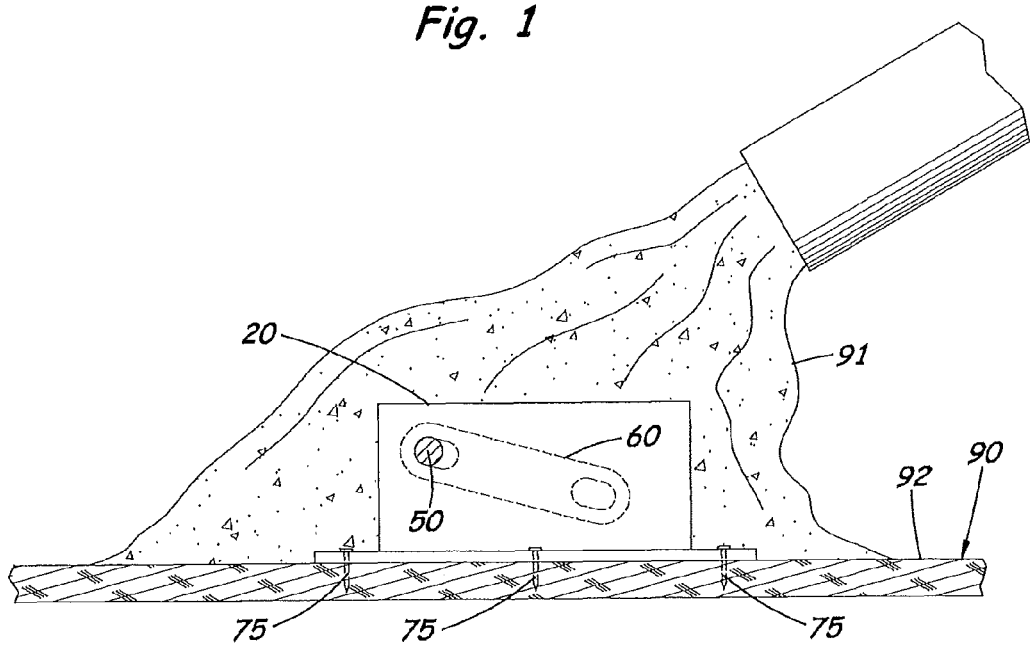
FIG. 2 is an illustration showing the system assembled on the form used to construct a concrete deck.

A fall protection tie-off anchor point 8 created on a concrete deck 10 that includes a receiver box 20 oriented so the lower slot opening 38 is flush with the bottom surface 11 of a finished concrete deck 10, which acts as a ceiling for a floor located below the deck 10, and exposed when the form 90 used to construct the concrete deck 10 is removed.

As shown in FIGS. 3 and 4, the receiver box 20 is a hollow, five-sided elongated box with two long walls 22, 24, two end walls 26, 28, and a top panel 30. Formed on the receiver box 20 opposite the top panel 30 is a rectangular slot opening 38 that leads to a narrow interior cavity 40. Disposed around the slot opening 38 and perpendicular aligned with the box's side walls 22, 24 and end walls 26, 28 are four laterally extending mounting surfaces 42, 44, 46, and 48, respectively. Formed on each flange surface is at least one nail hole 43, 45, 47, and 49, respectively. During assembly, a suitable nails 78 are inserted through the holes 43, 45, 47, and 49 to attach the receiver box 20 to the inside surface 92 of the form 90.

Formed on the receiver box's two opposite long walls 22, 24 are two rod openings 23, 25 configured to receive a rod 50 extending transversely through the inner cavity 40 formed in the receiver box 12. The ends of the rods 50 extend laterally and are embedded in the concrete 91 as shown in FIG. 4.

The system 8 also includes a connector plate 60 that connects to the portion of the rod 50 that extends into the inner cavity 40. In one embodiment, the connector plate 60 is a flat, elongated plate with two elongated, oval-shaped holes 62, 64 formed on its opposite ends. During assembly, the connector plate 60 is inserted into the inner cavity 40 so the rod 50 extends through the top hole 62 to connect the connector plate 60 to the rod 50. The connector plate 60 can rotate freely around the rod 50 and is sufficient in length so the opposite end of the connector plate 60 extends through the slot opening 38 when the receiver box 20 when the wood form 90 is removed. When the form 90 is removed, the connector plate 60 automatically rotates so the lower elongated hole 64 on the connector plate 60 is exposed. A worker may connect to a suitable D-ring connector 80 to the lower hole 64 when working on or under the ceiling.

Figure 6:
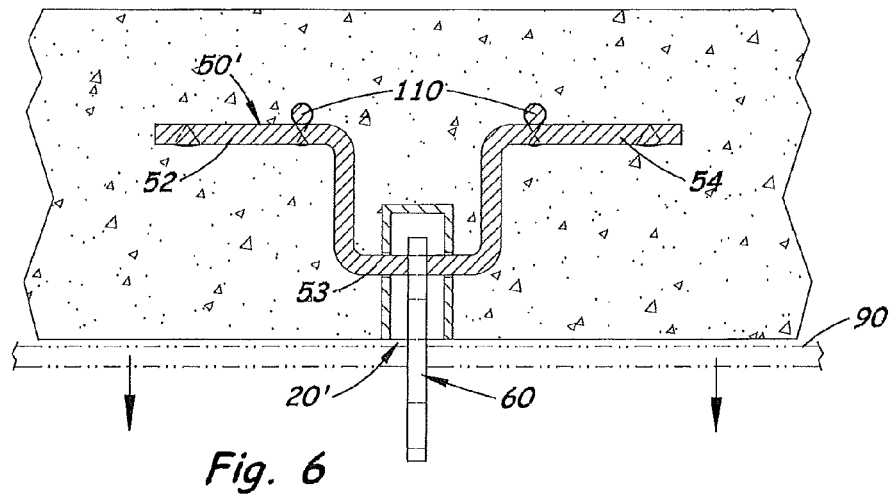
FIG. 6 is an alternative embodiment of the anchor system.

FIG. 6 is a second embodiment of the anchor system that uses a U-shaped rod 50' in place of a straight rod 50. The rod 50' includes two upper arm sections 52, 54 that extend upward from the receiver box 20' and attach to the structural rebar members 110 assembled in the deck above the receiver box 20'. The receiver box 20' is identical to the receiver box 20 accept for the absence of flange members. During assembly, the receiver box 20' is positioned over the wood form and the two upper arm sections 52, 54 are then tied to the rebar members 110 to hold the receiver box 20' in place.

In the embodiment shown in the Figs., the receiver box 20, 20' measures approximately 8 inches is length, 3 inches in height, and ¾ inches in width. The side walls, end walls and top panel are made of plastic approximately ⅛ inches thick. The two rod openings 23, 25 are approximately 11/16 inches in diameter and the rod 50 is approximately ½ inch in diameter and 8 to 16 inches in length. On receiver box 20, the mounting surfaces 42, 44, 46, and 48, includes at least one nail hole 43, 45, 47, and 49, respectively, that measure approximately ¼ inches in diameter. It should be understood that receiver box 20, 20' may include one or more mounting surfaces 42, 44, 46, and 48.

The connector plate 60 is a flat thin metal or other composite material meeting the OSHA 5000 lb to 10,000 lb. requirement for anchorage points and varies in length depending on the required structural thickness of the concrete deck 10 it is being installed in. The connector plate 60 measures approximately 7 to 9 inches in length, 2 inches in width and ¼ inch thick. The elongated holes 62 and 64 measure approximately 1¾ inches in length, and 1¼ inches in width.

As stated above, the rod 50 and connector plate 60 are assembled on the receiver box 20. The connector plate 60 is then rotated inside the interior cavity 40 and the mounting surfaces 42, 44, 46, and 48 are then positioned at a desired location over the inside surface 92 of the form 90. Nails 75 are then inserted into the nail holes 43, 45, 47, and 49 to hold the receiver box 20 on the form 90. Wet concrete 91 is then poured over the form 90 and over the receiver box 20 and the exposed ends of the rod 50. After the concrete 91 has cured, the form 90 is then removed thereby exposing the slot opening 38 and the connection plate 60. Gravity causes the connector plate 60 t rotate around the rod 50 so the lower elongated hole 64 is exposed and may be accessed by a worker.

A method for constructing a tie-off anchor system in a concrete deck is also disclosed comprising the following steps;

a. constructing a form configured to form a concrete deck, said form includes a lower surface;

b. selecting a receiver box with two long side walls, two short end walls, a top wall, a lower opening, an interior cavity, and at least one flange surface;

c. attaching said receiver box on the inside surface of said form;

d. selecting a rod and extending said rod through said long side walls on said receiver box and transversely over said interior cavity, said rod including opposite ends that extend laterally from said side walls;

e. attaching a connector plate attached a portion of said rod located inside said interior cavity; and, f. attaching said receiver box over said inside surface of said form.

Figure 7:
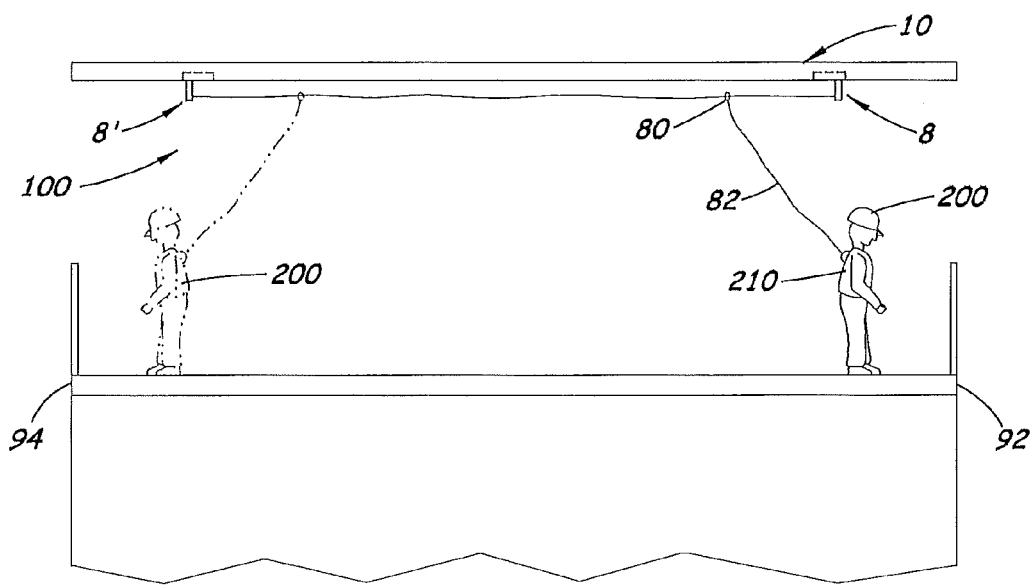
FIG. 7 is an illustration of an anchor system that includes at least two anchor points mounted on the ceiling and showing a worker on the floor of a building near the two leading edges attached to one end of a fall resistant lanyard that attaches at a higher end to cable that extends between the two anchor points.

FIG. 7 is an illustration of an anchor system 100 that includes at least two anchor points 8, 8' mounted on the ceiling and showing a worker 200 wearing a safety harness 202 attached to the lower end of a fall resistant lanyard 82 and working on the floor 92 of a building 90 near the two leading edges 94, 96. The upper end of the lanyard 82 is attached to a slide connector 80 that configured to slide freely over the cable 100.

Figure 8:
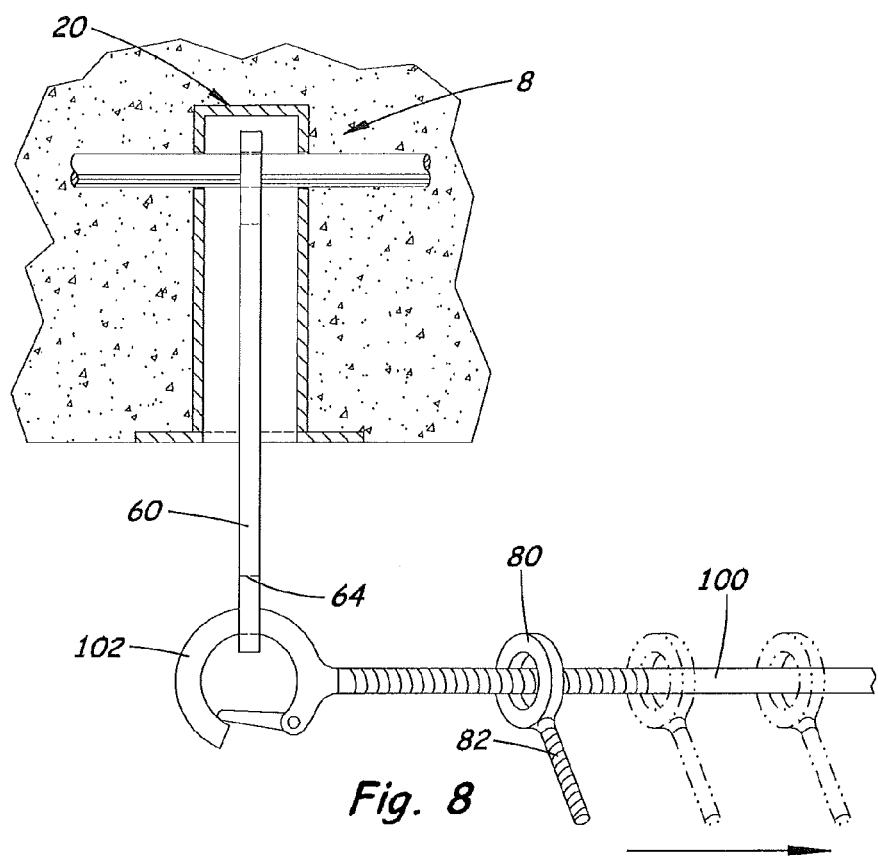
FIG. 8 is an illustration showing the connector plate extended from the receiver box and with the connector attached cable that extends laterally and showing a connector attached to a fall resistant lanyard and sliding over the cable.

FIG. 8 is an illustration showing in greater detail the connector plate 60 extended from the receiver box 20 and with the connector 102 attached cable 100 that extends laterally and showing a connector 80 attached to a fall resistant lanyard 82 and sliding over the cable 100

In compliance with the statute, the invention described has been described in language more or less specific as to structural features. It should be understood however, that the invention is not limited to the specific features shown, since the means and construction shown, comprises the preferred embodiments for putting the invention into effect. The invention is therefore claimed in its forms or modifications within the legitimate and valid scope of the amended claims, appropriately interpreted under the doctrine of equivalents.

I claim:

1. A concrete deck embedded, ceiling anchor point, comprising;
    a. a receiver box embedded into a concrete deck, said receiver box includes two long side walls, two short end walls, a top wall, a lower slot opening flush with the bottom surface of said concrete deck, and an interior cavity;
    b. a rod extending transversely through said interior cavity, said rod including a center portion located inside said interior cavity and two opposite ends that extend laterally from said long side walls on said receiver box and are embedded into the concrete deck; and,
    c. an elongated connector plate attached at one end to said center portion of said rod located inside said interior cavity, said connector plate configured to rotate at one end over said rod and move between a hidden longitudinally aligned position inside said receiver box and a visible downward position extends through said lower slot opening, said connector plate includes a hole located near an end opposite said end connected to said rod.

2. The anchor point as recited in claim 1, further including at least one flange surface said receiver box configured to extend over a wood form used to form the bottom surface of a concrete deck.

3. The anchor point as recited in claim 2, further including a hole formed on said flange surface configured to receive a nail or screw that attaches said flange surface to the wood form.

4. The anchor point, as recited in claim 1, wherein said rod is straight.

5. The anchor point, as recited in claim 1, wherein said rod is u-shaped with a straight intermediate member with two upward extending arms located on opposite ends of said intermediate member.

6. The anchor point, as recited in claim 1 where said rod is attached to rebar members located inside said concrete deck.

7. The anchor point as recited in claim 1, wherein said connector plate is 7 to 9 inches in length.

8. The anchor points as recited in claim 1, wherein at least one said holes formed on said connector plate are oval shaped.

* * * * *